UNITED STATES PATENT OFFICE.

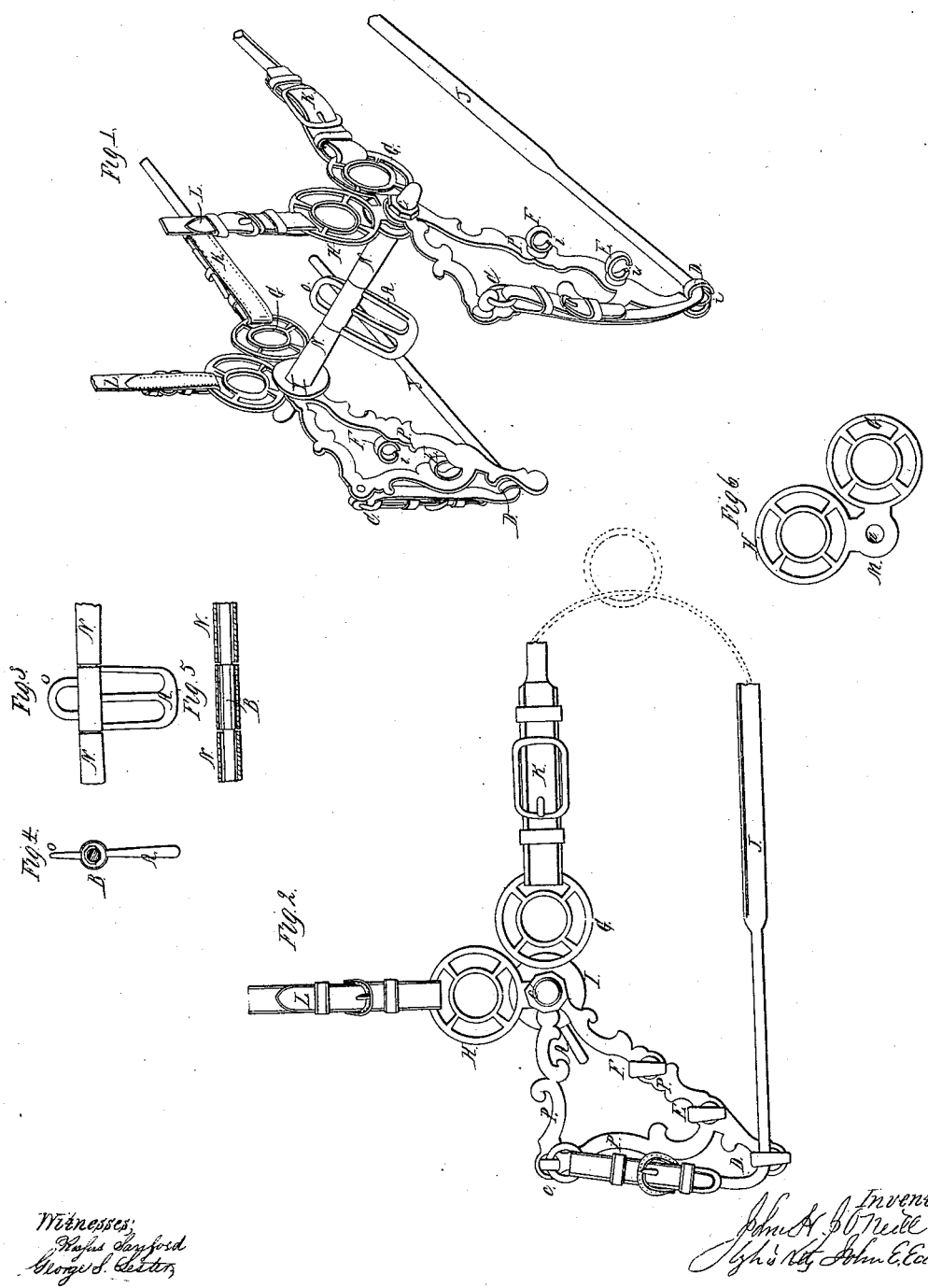

JOHN H. J. O'NEILL, OF NEW HAVEN, CONNECTICUT.

IMPROVEMENT IN BRIDLE-BITS.

Specification forming part of Letters Patent No. 39,165, dated July 7, 1863; antedated May 15, 1863.

*To all whom it may concern:*

Be it known that I, JOHN H. J. O'NEILL, of the city and county of New Haven and State of Connecticut, have invented a new and useful Improvement in Bridle-Bits; and I do hereby declare the following is a full, clear, and exact description thereof, reference being had to the accompanying drawings, making a part of this specification, in which—

Figure 1 is a perspective view. Fig. 2 is a side view. Figs. 3, 4, 5, and 6 are detached parts of the same.

Same letters refer to like parts.

The nature of my invention consists in constructing and operating a gag, so as to bear directly upon the tongue of the animal when the driver desires to curb or check him; also, in a ready adjustment of the power of the gag or curb, and, further, in an arrangement whereby I prevent the animal from grasping or "taking the bits in his teeth."

To enable others skilled to make and use my invention, I will proceed to describe its construction and operation.

A is a gag, placed in the middle of a bar, B. (See Fig. 5.) That portion of the said bar is made square, or of such form as to prevent the gag from turning thereon. Each side of the gag A, and on the bar B, I place thimbles N N, which are loose upon and turn freely on the bar B.

I I are guards or shields to protect the animal's mouth or lips from the operative mechanism of the bits.

H and G are rings, connected, as see Fig. 6, and attached to the bar B by a hole, *a*, in the connection of the two rings, and in which hole the bar B may freely turn.

L L are the head straps, attached to the rings H H.

K K are the guiding-lines, attached to the rings G G.

P P are levers, firmly fixed to the bar B by nuts *c* for the purpose of turning the bar B to operate the gag A.

To the ring C, I attach the curb-rein J, from thence run it through the ring D on the lower extremity of the lever P. When the bit is in the animal's mouth, the gag lies nearly in the position shown in Fig. 2 and rests upon the animal's tongue. When drawing upon the rein K, the effect is similar to any ordinary straight bit, but should the animal become unmanageable, or if from other cause it is desired to curb or check him suddenly, drawing upon the curb-rein J will turn the gag A down, as in Fig. 4, hard upon the animal's tongue, which experience with this bit proves will obtain the desired result. To prevent the animal from getting his tongue over the gag, I make an extension, O, of the gag back, and to prevent the animal from taking the bits in his teeth the thimbles N N are used, and lie between the teeth, and if grasped ever so firmly the bar and gag will turn perfectly free.

For the purpose of adjusting the power of the rein upon the gag, I fix upon the levers P adjustable rings D, E, and F. These rings (see Fig. 1) I make open, as at *i*, so that the rein J may be taken from one and slipped into another without the trouble of detaching the rein from the ring C.

The two reins J and K may, if required, be united so as to operate both from one line in the driver's hands.

Having thus fully described my invention, what I claim therein as new and useful, and desire to secure by Letters Patent, is—

1. The open adjusting-rings described, when the same are used in combination with bridle-bits, in the manner and for the purpose substantially as herein set forth.

2. The combination and arrangement described of the bar B, gag A, thimbles N N, and levers P P, constructed and operating substantially in the manner and for the purpose as herein set forth and described.

JOHN H. J. O'NEILL.

Witnesses:
JOHN E. EARLE,
WM. OLMSTEAD.